US012809041B2

(12) United States Patent
Nakagawa

(10) Patent No.: US 12,809,041 B2
(45) Date of Patent: Nov. 24, 2026

(54) METHODS AND SYSTEMS FOR PARKING LOCATION NAVIGATION

(71) Applicant: Toyota Motor Engineering & Manufacturing North America, Inc., Plano, TX (US)

(72) Inventor: Masashi Nakagawa, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 338 days.

(21) Appl. No.: 17/092,981

(22) Filed: Nov. 9, 2020

(65) Prior Publication Data

US 2022/0146693 A1 May 12, 2022

(51) Int. Cl.

| | |
|---|---|
| ***G01S 19/51*** | (2010.01) |
| ***G06F 3/16*** | (2006.01) |
| ***G08B 3/10*** | (2006.01) |
| ***G08G 1/00*** | (2006.01) |
| ***H04W 4/40*** | (2018.01) |

(52) U.S. Cl.

CPC .............. *G01S 19/51* (2013.01); *G06F 3/165* (2013.01); *G08B 3/10* (2013.01); *G08G 1/20* (2013.01); *H04W 4/40* (2018.02)

(58) Field of Classification Search

CPC .......... G01S 19/51; H04W 4/40; G06F 3/165; G08B 3/10; G08G 1/20

See application file for complete search history.

(56) References Cited

U.S. PATENT DOCUMENTS

| | | | | |
|---|---|---|---|---|
| 6,392,592 | B1 * | 5/2002 | Johnson | G08G 1/123 455/352 |
| 6,407,698 | B1 | 6/2002 | Ayed | |
| 2002/0008614 | A1 | 1/2002 | Yeh et al. | |
| 2010/0161209 | A1 | 6/2010 | Vaghefinazari | |
| 2010/0318288 | A1 * | 12/2010 | Korn | G01S 19/48 342/386 |
| 2014/0232570 | A1 * | 8/2014 | Skinder | G01C 21/20 340/989 |
| 2018/0128639 | A1 | 5/2018 | Lemke | |
| 2019/0137990 | A1 * | 5/2019 | Golgiri | B60W 30/06 |
| 2019/0202445 | A1 * | 7/2019 | Lavoie | G05D 1/0022 |

FOREIGN PATENT DOCUMENTS

| | | | | |
|---|---|---|---|---|
| CN | 104507162 | * | 4/2015 | H04W 64/003 |
| DE | 102011009960 A1 | * | 8/2012 | G01S 7/52004 |
| ES | 2746889 | * | 3/2020 | G01C 21/343 |
| KR | 20050018089 A | | 2/2005 | |

(Continued)

OTHER PUBLICATIONS

ES_2746889 translation (Year: 2020).*

(Continued)

*Primary Examiner* — Joan T Goodbody
(74) *Attorney, Agent, or Firm* — Dinsmore & Shohl LLP

(57) ABSTRACT

A method comprises determining a relative position between a mobile device and a parked vehicle and causing one or more sounds to be emitted, wherein a volume or a pattern of the one or more sounds is based on the relative position between the mobile device and the parked vehicle.

10 Claims, 5 Drawing Sheets

(56) References Cited

FOREIGN PATENT DOCUMENTS

| | | | | |
|---|---|---|---|---|
| KR | 20060081844 | * | 7/2006 | ............ H04W 64/00 |
| KR | 20160093435 A | | 8/2016 | |

OTHER PUBLICATIONS

KR_20060081844 translation (Year: 2006).*

Shoval S, Borenstein J, Koren Y. The NavBelt—a computerized travel aid for the blind based on mobile robotics technology. IEEE Trans Biomed Eng. Nov. 1998;45(11):1376-86. (Year: 1998).*

Visually Impaired with Depth-Based Spatial Sound, 2015 IEEE International Conference on Computer Vision Workshop (ICCVW), Santiago, Chile, 2015, pp. 418-426. (Year: 2015).*

Kubanek M, Bobulski J. "Device for Acoustic Support of Orientation in the Surroundings for Blind People. Sensors (Basel)", Dec 6, 2018;18(12):4309, (Year: 2018).*

Mobomo, "Use Augmented Reality to Find Your Vehicle with Car Finder for iPhone", 2 pages, Nov. 2, 2009, https://www.mobomo.com/2009/11/use-augmentedreality-to-find-your-vehicle-with-car-finder-for-iphone/.

Lance Whitney, "How to Use a Smartphone App to Find Your Car", 13 pages, Apr. 13, 2017, https://in.pcmag.com/software/113908/how-to-use-a-smartphoneapp- to-find-your-car.

* cited by examiner

METHODS AND SYSTEMS FOR PARKING LOCATION NAVIGATION

TECHNICAL FIELD

The present specification relates to locating a parked vehicle, and more particularly, to methods and systems for parking location navigation.

BACKGROUND

When a driver parks their vehicle in a parking lot or other parking structure and then enters a building, the driver may not remember where the vehicle is parked. As such, when the driver exits the building, they may have difficulty locating the parked vehicle. Accordingly, there is a need for methods and systems for parking location navigation.

SUMMARY

In an embodiment, a method may include determining a relative position between a mobile device and a parked vehicle and causing one or more sounds to be emitted. A volume or a pattern of the one or more sounds may be based on the relative position between the mobile device and the parked vehicle.

In another embodiment, a method may include, upon determination that a mobile device is not able to receive a GPS signal when a vehicle is parked, monitoring a relative position between the mobile device and the vehicle as the mobile device moves away from the vehicle until the mobile device is able to receive a GPS signal. The method may also include, upon determination that the mobile device is able to receive a GPS signal, determining a location of the mobile device based on the GPS signal and determining a location of the vehicle based on the location of the mobile device and the relative position between the mobile device and the vehicle.

In another embodiment, a mobile device may include a controller configured to determine a relative position between the mobile device and a parked vehicle and cause one or more sounds to be emitted from the mobile device. A volume or a pattern of the one or more sounds may be based on the relative position between the mobile device and the parked vehicle.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for parking location navigation. When a driver of a vehicle parks the vehicle, the driver may carry a mobile device that may determine and record the location of the parked vehicle. If a GPS signal is available when the driver parks the vehicle, the mobile device may receive GPS coordinates and may record the received GPS coordinates as the location of the parked vehicle. If a GPS signal is not available when the driver parks the vehicle, the mobile device may record the relative position of the driver as the driver walks away from the parked vehicle. If a GPS signal later becomes available, the mobile device may receive GPS coordinates and may determine the location of the parked vehicle based on the received GPS coordinates and the relative position of the driver with respect to the vehicle when the GPS coordinates are received.

When the driver returns to the parked vehicle, the mobile device may emit sounds based on the relative position between the driver and the vehicle. As the driver's position changes (e.g., as the driver moves closer to or further away from the parked vehicle), the sounds emitted by the mobile device may change. For example, the frequency and/or volume of the sounds emitted by the mobile device may change based on the relative position between the mobile device and the vehicle. As such, the driver may navigate to the location of the parked vehicle based on the sounds emitted by the mobile device.

Figure 1:
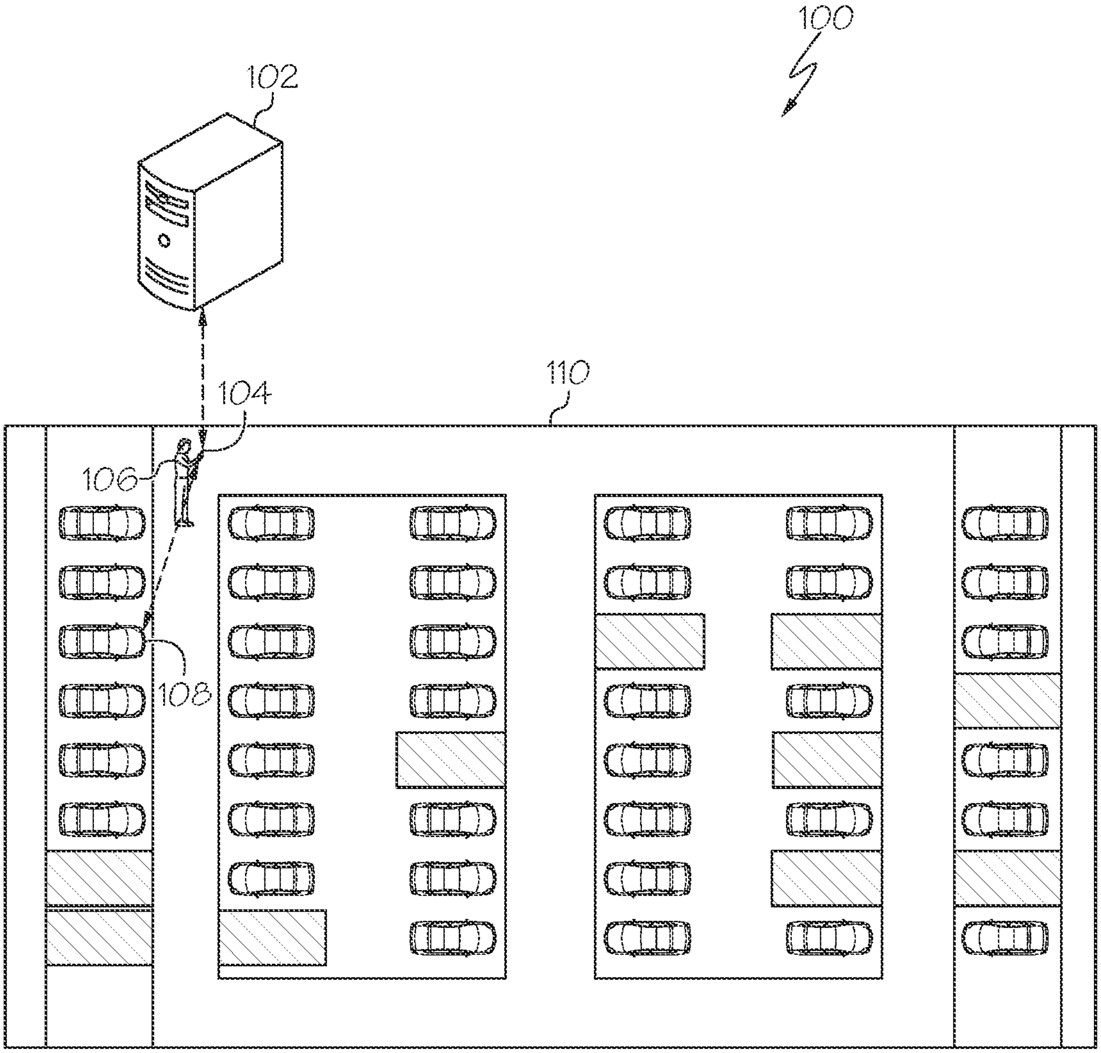
FIG. 1 schematically depicts a system for parking location navigation, according to one or more embodiments shown and described herein.

Turning now to the figures, FIG. 1 schematically depicts a parking location navigation system 100. The system 100 includes a server or remote computing device 102 and a mobile device 104. The mobile device 104 may be carried by a driver 106. The mobile device 104 may be communicatively coupled to the server 102, as disclosed herein.

In the example of FIG. 1, the driver 106 has parked a vehicle 108 in a parking lot 110. The driver 106 then walks away from the parked vehicle 108 towards a destination (e.g., a building adjacent to the parking lot 110). If the mobile device 104 is able to detect a GPS signal (e.g., if the parking lot 110 is outside), the mobile device may determine its position using a received GPS signal when the vehicle 108 is parked. However, if the mobile device 104 is not able to detect a GPS signal when the vehicle 108 is parked (e.g., if the parking lot 110 is an indoor parking garage), then the mobile device 104 may record the relative position of the driver 106 with respect to the parked vehicle 108 while the driver 106 walks away from the vehicle. For example, the relative position of the driver 106 with respect the parked vehicle 108 may be determined based on communication signals between the mobile device 104 and the parked vehicle 108. As another example, the mobile device 104 may record its trajectory including orientations and distances from the location of the parked vehicle 108. When a GPS signal becomes available, the mobile device 104 may determine the location of the parked vehicle based on the received GPS signal and the relative position of the driver 106 with respect to the vehicle 108, as disclosed herein.

After the mobile device 104 is able to determine the position of the parked vehicle 108, the mobile device 104 may transmit the determined position to the server 102. The server 102 may store the location of the parked vehicle 108 until the driver 106 is ready to return to the vehicle 108. When the driver 106 is ready to return to the vehicle 108, the server 102 may determine a distance and direction between the mobile device 104 and the vehicle 108, which may be transmitted to the mobile device 104. The mobile device 104 may then emit sounds based on the relative position between the driver 106 and the vehicle 108. The position of the driver 106 may be determined based on the location of the mobile device 104. The location of the mobile device 104 may be determined based on a GPS signal. If a GPS signal is not available, the location of the mobile device 104 may be calculated based on the previous location of the mobile device 104 where the GPS signal was lastly available and the trajectory of the mobile device 104 from the previous location. As the relative position between the driver 106 and the vehicle 108 changes, the sounds emitted by the mobile device 104 may change accordingly. Thus, the driver 106 may use the sounds emitted by the mobile device 104 to navigate back to the parked vehicle 108.

Figure 2:
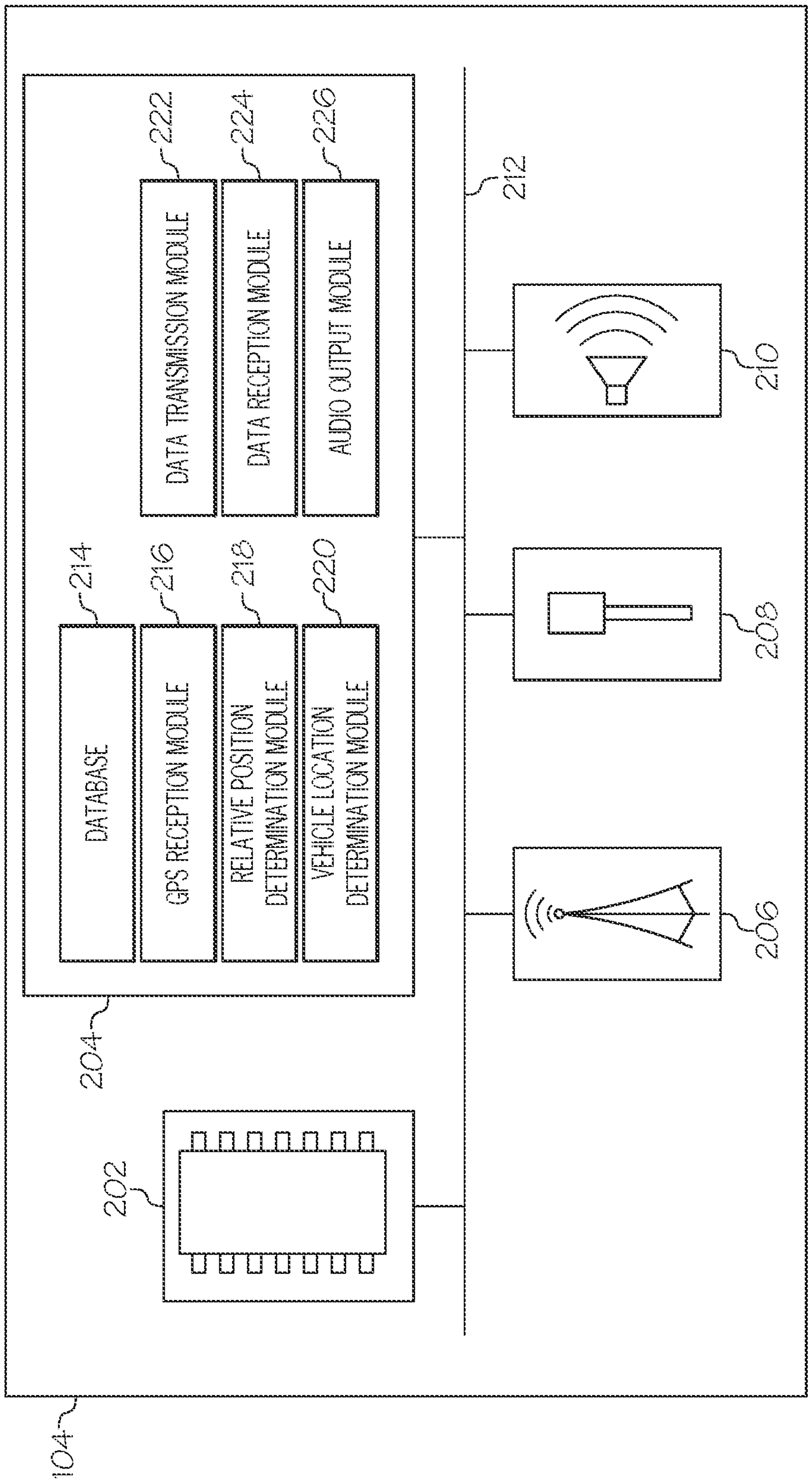
FIG. 2 depicts a schematic diagram of a mobile device that may be part of the system of FIG. 1, according to one or more embodiments shown and described herein.

Now referring to FIG. 2, a schematic diagram of the mobile device 104 is shown. The mobile device 104 may comprise a smart phone, a key fob, or any other mobile device that may be carried by the driver. The mobile device 104 includes one or more processors 202, one or more memory modules 204, network interface hardware 206, a satellite antenna 208, one or more speakers 210, and a communication path 212. The one or more processors 202 may be a controller, an integrated circuit, a microchip, a computer, or any other computing device. The one or more memory modules 204 may comprise RAM, ROM, flash memories, hard drives, or any device capable of storing machine readable and executable instructions such that the machine readable and executable instructions can be accessed by the one or more processors 202.

The network interface hardware 206 can be communicatively coupled to the communication path 212 and can be any device capable of transmitting and/or receiving data via a network. Accordingly, the network interface hardware 206 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 206 includes hardware configured to operate in accordance with the Bluetooth® wireless communication protocol. The network interface hardware 206 of the mobile device 104 may transmit and receive data to and from the server 102.

The one or more memory modules 204 include a database 214, a GPS reception module 216, a relative position determination module 218, a vehicle location determination module 220, a data transmission module 222, a data reception module 224, and an audio output module 226. Each of the database 214, the GPS reception module 216, the relative position determination module 218, the vehicle location determination module 220, the data transmission module 222, the data reception module 224, and the audio output module 226 may be a program module in the form of operating systems, application program modules, and other program modules stored in one or more memory modules 204. In some embodiments, the program module may be stored in a remote storage device that may communicate with the mobile device 104. Such a program module may include, but is not limited to, routines, subroutines, programs, objects, components, data structures and the like for performing specific tasks or executing specific data types as will be described below.

Referring still to FIG. 2, the mobile device 104 comprises a satellite antenna 208 coupled to the communication path 212 such that the communication path 212 communicatively couples the satellite antenna 208 to other modules of the mobile device 104. The satellite antenna 208 is configured to receive signals from global positioning system (GPS) satellites. Specifically, in one embodiment, the satellite antenna 208 includes one or more conductive elements that interact with electromagnetic signals transmitted by GPS satellites. The received signal is transformed into a data signal indicative of the location (e.g., latitude and longitude) of the satellite antenna 208, and consequently, the location of the mobile device 104.

The speakers 210 may output audio signals specified by the audio output module 226, as disclosed in further detail below. The audio output by the speakers may be audible to the driver 106 carrying the mobile device 104.

The database 214 may temporarily and/or permanently store a variety of data used by the memory modules 204 and/or other components of the mobile device 104. The data stored in the database 214 is discussed in further detail below.

The GPS reception module 216 may receive a GPS signal captured by the satellite antenna 208. In particular, the GPS reception module 216 may receive a GPS signal indicative of a location of the mobile device 104 (which may be referred to herein as a GPS location). In some examples, the GPS reception module 216 may receive a GPS signal when the satellite antenna 208 is able to capture a GPS signal. For example, if the satellite antenna 208 is able to capture a GPS signal when the vehicle 108 is parked, the GPS reception module 216 may receive the GPS signal indicative of the location of the mobile device 104 at that time. If the satellite antenna 208 is not able to capture a GPS signal when the vehicle 108 is parked, the GPS reception module 216 may receive the GPS signal indicative of the location of the mobile device 104 when the satellite antenna 208 is able to capture a GPS signal (e.g., as the driver 106 carries the mobile device 104 to a location with better signal availability).

The relative position determination module 218 may record the relative position of the mobile device 104 with respect to the parked vehicle 108. For example, as the driver 106 carries the mobile device 104 away from the vehicle 108 after parking, the relative position determination module 218 may monitor the movement of the mobile device 104 as it is carried by the driver 106. Alternatively, as the driver 106 returns to the parked vehicle 108, the relative position determination module 218 may monitor the movement of the mobile device 104 as it is carried by the driver 106. In some examples, the relative position determination module 218 may monitor the movement of the mobile device 104 using a motion sensor (not shown in FIG. 2) that may be part of the mobile device 104. Accordingly, the relative position determination module 218 may determine the distance and direction between the mobile device 104 and the vehicle 108 at all times. As the driver 106 carries the mobile device 104, the relative position determination module 218 may store the relative position of the mobile device 104 with respect to the vehicle 108 (e.g., the distance and direction between the mobile device 104 and the vehicle 108) in the database 214. By monitoring the movement of the mobile device 104, the relative position determination module 218 may determine the relative location of the mobile device 104 (and the driver 106 carrying the mobile device 104) with respect to the vehicle 108 even when a GPS signal is not available. When a GPS signal does become available, the mobile device 104 may determine the absolute position of the vehicle 108 based on a received GPS signal and the relative position recorded by the relative position determination module 218, as described in further detail below.

The vehicle location determination module 220 may determine the location of the parked vehicle 108. If the GPS reception module 216 is able to determine a GPS location of the mobile device 104 when the vehicle 108 is parked (when the mobile device 104 is still located in the vehicle 108), then the vehicle location determination module 220 may determine that the location of the parked vehicle 108 is equal to the position of the mobile device 104 as determined by the GPS reception module 216.

However, if the GPS reception module 216 is unable to determine a GPS location of the mobile device 104 when the vehicle 108 is parked, the vehicle location determination module 220 may determine the location of the parked vehicle 108 after the driver begins to walk away from the vehicle 108, as disclosed herein. As described above, as the driver 106 walks away from the vehicle 108 while carrying the mobile device 104, the relative position determination module 218 may monitor the movement of the mobile device 104. In particular, the relative position determination module 218 may determine the relative position of the mobile device 104 with respect to the vehicle 108. Then, once the GPS reception module 216 is able to determine the GPS location of the mobile device 104, the vehicle location determination module 220 may determine the location of the vehicle 108 based on the GPS location of the mobile device 104 and the relative position of the mobile device 104 with respect to the vehicle 108.

For example, if the relative position determination module 218 determines a particular relative position of the mobile device 104 with respect to the vehicle 108 when the GPS reception module 216 is able to determine the GPS location of the mobile device 104, then the vehicle location determination module 220 may add the distance and direction of the determined relative position to the location of the mobile device 104 determined by the GPS reception module 216 to determine the location of the parked vehicle 108. After the vehicle location determination module 220 determines the location of the vehicle 108, the location may be stored in the database 214.

The data transmission module 222 may transmit the location of the vehicle 108 determined by the vehicle location determination module 220 to the server 102. The server 102 may then store the location, as described in further detail below. By transmitting the parked vehicle location to the server 102, the mobile device 104 does not need to store the location while the driver 106 is away from the parked vehicle 108. As the driver 106 may be away from the vehicle 108 for a long period of time (e.g., while shopping, eating a meal, attending a concert, or the like), by storing the location of the parked vehicle 108 away from the mobile device 104, the mobile device 104 may utilize less power and increase its battery life. In addition, devices other than the mobile device 104 may be able to access the location of the vehicle 108 (e.g., mobile devices of family members). However, in some examples, the mobile device 104 may not transmit the location of the vehicle 108 to the server 102 and may instead store the location locally in the database 214.

The data reception module 224 may receive the location of the parked vehicle 108 and/or the relative position between the mobile device 104 and the parked vehicle 108 from the server 102. As explained above, once the mobile device 104 determines the location of the parked vehicle 108, its location may be stored on the server 102. Thus, when the driver 106 is ready to return to the vehicle 108, the data reception module 224 may receive the location of the vehicle 108 and/or the relative position between the mobile device 104 and the parked vehicle 108. The mobile device 104 may then guide the driver 106 back to the vehicle 108, as described herein.

The audio output module 226 may cause the speaker 210 to output audible sounds that may be heard by the driver 106. In particular, the audio output module 226 may cause the speaker 210 to output sounds based on the relative position between the mobile device 104 and the vehicle 108. For example, the frequency and/or volume of the sounds output by the speaker 210 may depend on the position of the mobile device 104 with respect to the vehicle 108. As such, the driver 106 may rely on the sound output by the speaker 210 to navigate to the location of the parked vehicle 108.

In some examples, the mobile device 104 may comprise a screen that may display a position of the mobile device 104 and the position of the vehicle 108. In these examples, the driver 106 may look at the screen to navigate to the location of the parked vehicle 108. As the driver 106 moves, the display may change to update the location of the mobile device 104. However, a screen and a display may require the mobile device 104 to have extra hardware, extra computing power, and extra battery life. As such, in the illustrated example, the mobile device 104 outputs an audio signal to direct the driver 106 to the parked vehicle 108. Accordingly, the mobile device 104 may utilize less resources and may be smaller and more compact than would be required for a mobile device having a display screen.

In the illustrated example, the audio output module 226 causes the speaker 210 to output audio based on the relative position between the mobile device 104 and the parked vehicle 108. In some examples, the audio output module 226 may cause the speaker 210 to output a continuous tone. In other examples, the audio output module 226 may cause the speaker 210 to output an intermittent tone (e.g., a continuous beeping sound). The audio output module 226 may cause the sound output by the speaker 210 to change based on the distance between the mobile device 104 and the vehicle 108. For example, the volume of the sound emitted by the speaker 210 may increase as the mobile device 104 gets closer to the vehicle 108.

In examples where the audio output module 226 causes the speaker 210 to output an intermittent tone (e.g., a periodic beeping), the frequency at which the tone is emitted may change based on the direction between the mobile device 104 and the driver carrying the mobile device 104. For example, the speaker 210 may beep with a low frequency when the mobile device 104 is far from the vehicle 108 and the frequency of the beeping may increase as the mobile device 104 gets closer to the vehicle 108. In other examples, the audio output module 226 may cause the speaker 210 to output an intermittent tone in a particular pattern based on the distance and/or direction between the mobile device 104 and the vehicle 108.

In some examples, the pitch of the sound output by the speaker 210 may change based on the direction between the mobile device 104 and the vehicle 108. For example, if the audio output module 226 causes the speaker 210 to output a continuous or periodic tone, the tone may be high pitched when the vehicle 108 is in front of the driver 106 carrying the mobile device 104 and the tone may be low pitched when the vehicle 108 is behind the driver 106 carrying the mobile device 104. The pitch of the tone may also change based on whether the vehicle 108 is to the right or to the left of the driver 106 carrying the mobile device 104. As the driver 106 carrying the mobile device 104 moves around and changes direction with respect to the vehicle 108, the pitch of the tone emitted by the speaker 210 may change. In some examples, the audio output module 226 may cause the speaker 210 to output a voice indicating a distance and/or direction to the parked vehicle 108. As such, the driver 106 may listen to the sound output by the speaker 210 to be guided to the parked vehicle 108.

In some examples, the audio output module 226 may transmit a signal to the parked vehicle 108 to cause the vehicle 108 to emit a sound (e.g., cause the horn to sound) based on the relative position of the vehicle 108 with respect to the mobile device 104. For example, the audio output module 226 may cause the horn of the vehicle to sound periodically in short segments. The audio output module 226 may cause the frequency of the horn sounding or the volume of the horn to change based on the distance and/or direction from the mobile device 104 to the vehicle 108. The audio output module 226 may also cause the horn of the vehicle 108 to sound in a different pattern depending on the direction and/or distance from the mobile device 104 to the vehicle 108. As such, in these examples, the driver 106 may listen to the sound of the horn in order to locate the vehicle 108. In these examples, the audio output module 226 may cause a sound to be emitted by the vehicle 108 either in addition to or instead of the sound emitted by the speaker 210 of the mobile device 104.

Figure 3:
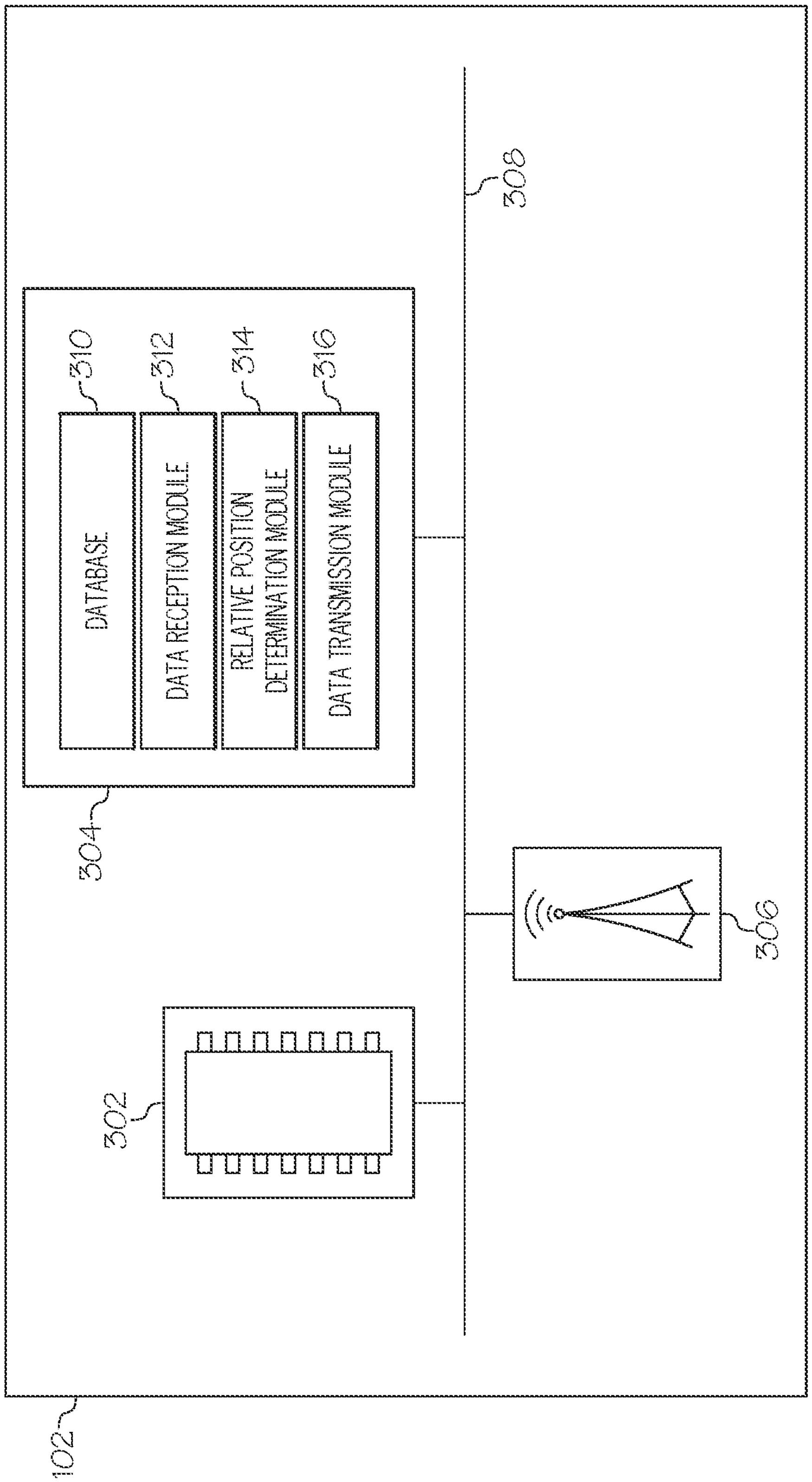
FIG. 3 depicts a schematic diagram of a server that may be part of the system of FIG. 1, according to one or more embodiments shown and described herein.

Now referring to FIG. 3, a schematic diagram of the server 102 is shown. In some examples, the server 102 may comprise an edge server. In some examples, the server 102 may comprise a cloud-based server. In other examples, the server 102 may comprise any other suitable computing device. The server 102 includes one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 206 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the mobile device 104 may transmit and receive data to and from the mobile device 104.

The one or more memory modules 304 include a database 310, a data reception module 312, a relative position determination module 314, and a data transmission module 316. Each of the database 310, the data reception module 312, the relative position determination module 314, and the data transmission module 316 may be a program module in the form of operating systems, application program modules, and other program modules stored in one or more memory modules 304. In some embodiments, the program module may be stored in a remote storage device that may communicate with the server 102. Such a program module may include, but is not limited to, routines, subroutines, programs, objects, components, data structures and the like for performing specific tasks or executing specific data types as will be described below.

The database 310 may temporarily and/or permanently store a variety of data used by the memory modules 204 and/or other components of the mobile device 104. In particular, the database 310 may store data received from the mobile device 104. The data stored in the database 310 is discussed in further detail below.

The data reception module 312 may receive data from the mobile device 104. As explained above, after the vehicle location determination module 220 of the mobile device 104 determines the location of the parked vehicle 108, the data transmission module 222 may transmit the location of the vehicle 108 to the server 102. As such, the data reception module 312 of the server 102 may receive the location of the vehicle 108. After the data reception module 312 receives the location of the vehicle 108, the location may be stored in the database 310.

The relative position determination module 314 may determine a relative position between the mobile device 104 and the parked vehicle 108. In particular, when the driver 106 is ready to return to the parked vehicle 108, the mobile device 104 may transmit its current location to the server 102. The data reception module 312 may receive the location of the mobile device 104 and may store the location in the database 310. The relative position determination module 314 may then determine the distance and direction between the current location of the mobile device 104 and the location of the parked vehicle 108 based on the received location of the mobile device 104 and the stored location of the vehicle 108.

The data transmission module 316 may transmit the relative position (e.g., the distance and direction) between the location of the mobile device 104 and the location of the parked vehicle 108 to the mobile device 104, as determined by the relative position determination module 314. Once the mobile device 104 receives the relative location of the vehicle 108 with respect to the mobile device 104, the mobile device 104 may emit audio sounds to guide the driver 106 to the parked vehicle 108, as described above.

Figure 4:
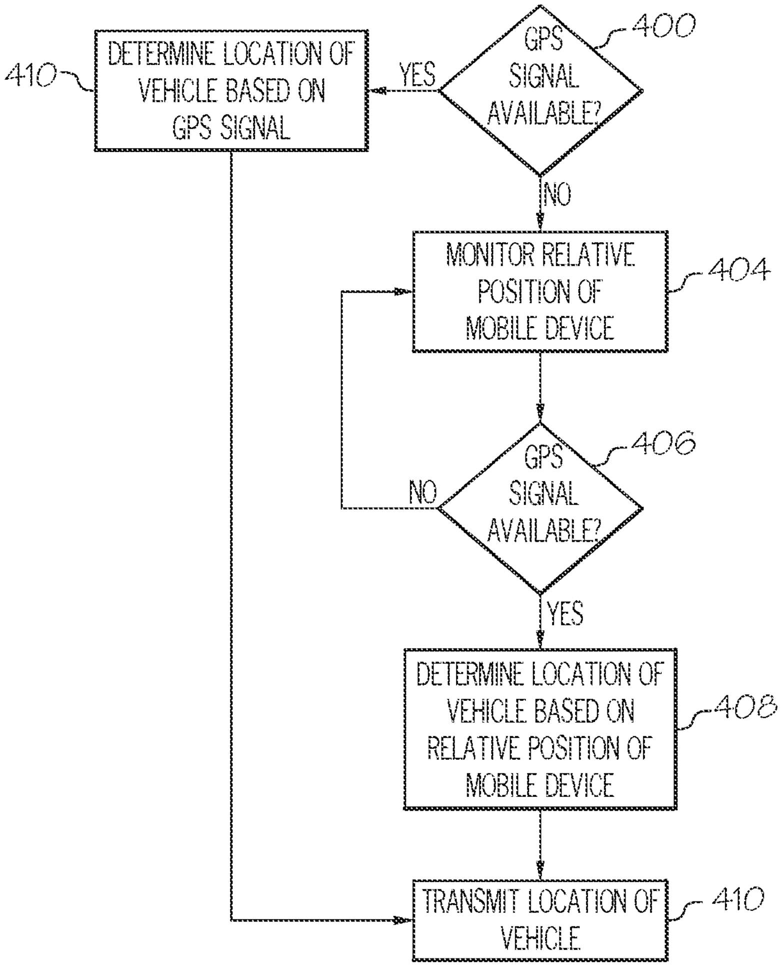
FIG. 4 depicts a flowchart of a method for operating the mobile device of FIG. 2, according to one or more embodiments shown and described herein.

FIG. 4 depicts a flowchart of a method for performing parking location navigation that may be performed by the mobile device 104. Specifically, FIG. 4 depicts a flowchart of a method that the mobile device 104 may perform to determine the location of vehicle 108 after it is parked. The flowchart is described herein with reference to FIGS. 1-2.

At step 400, the GPS reception module 216 may determine whether a GPS signal is able to be received by the satellite antenna 208. This may occur before the driver 106 leaves the parked vehicle 108, while the position of the mobile device 104 is the same as the position of the vehicle 108. If a GPS signal is available (yes at step 400), then at step 400 the GPS reception module 216 may receive the GPS location of the mobile device 104 from the satellite antenna 208. The vehicle location determination module 220 may then determine that the location of the vehicle 108 is the same as the location of the mobile device 104. Alternatively, if a GPS signal is not available (no at step 400), then control may pass to step 402.

At step 402, the relative position determination module 218 may monitor the relative position of the mobile device 104 with respect to the parked vehicle 108. In particular, the relative position determination module 218 may determine a distance and direction between the mobile device 104 and the parked vehicle 108. As the driver 106 walks away from the vehicle 108, the relative position determination module 218 may continually monitor the relative position between the mobile device 104 and the parked vehicle 108.

At step 406, the GPS reception module 216 may determine whether a GPS signal is able to be received by the satellite antenna 208. If a GPS signal is not able to be received by the satellite antenna 208 (no at step 406), then control returns to step 404. As such, the relative position determination module 218 may continue to determine the distance and direction between the mobile device 104 and the parked vehicle 108 while a GPS signal is unavailable. If a GPS signal is able to be received by the satellite antenna 208 (yes at step 406), then control passes to step 408.

At step 408, the GPS reception module 216 may receive a GPS signal from the satellite antenna 208 to determine the current position of the mobile device 104. The vehicle location determination module 220 may then determine the location of the parked vehicle 108 based on the current position of the mobile device 104 and the relative position of the mobile device 104 with respect to the vehicle 108. The location of the parked vehicle 108 may then be stored in the database 214. At step 410, the data transmission module 222 may transmit the determine location of the vehicle 108 to the server 102.

Figure 5:
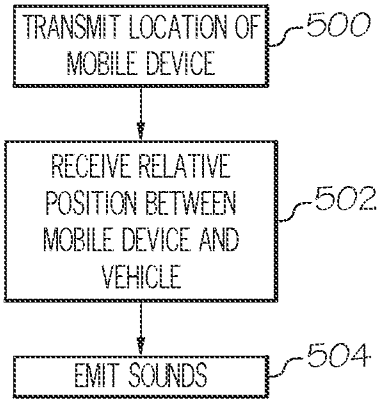
FIG. 5 depicts a flowchart of another method for operating the mobile device of FIG. 2, according to one or more embodiments shown and described herein.

FIG. 5 depicts a flowchart of a method for performing parking location navigation that may be performed by the mobile device 104. Specifically, FIG. 5 depicts a flowchart of a method that the mobile device 104 may perform to guide the driver 106 to the parked vehicle 108. The flowchart is described herein with reference to FIGS. 1-2.

The method of FIG. 5 may begin when the driver 106 indicates that they would like to be guided back to the parked vehicle 108 (e.g., by pressing a button on the mobile device 104). In some examples, the method of FIG. 5 may begin automatically when the driver 106 is at a certain location (e.g., when the driver returns to the parking lot 110 after parking the vehicle 108).

At step 500, the GPS reception module 216 may determine the current location of the mobile device 104 and the data transmission module 222 may transmit the determined location of the mobile device 104 to the server 102. After the server 102 receives the location of the mobile device 104, the server 102 may determine the relative position (e.g. the distance and direction) between the mobile device 104 and the parked vehicle 108, as described above At step 502, the data reception module 224 may receive the relative position (e.g., the distance and direction) between the mobile device 104 and the parked vehicle 108. Then, at step 504, the audio output module 226 may cause the speaker 210 to output one or more sounds based on the relative position between the mobile device 104 and the parked vehicle 108. For example, the volume, frequency, pitch, or patterns of sounds emitted by the speaker 210 may be based on the distance and direction between the mobile device 104 and the parked vehicle 108.

As the driver 106 carries the mobile device 104, the relative position determination module 218 may continue to monitor the relative position between the mobile device 104 and the parked vehicle 108. The audio output module 226 may continue to cause the speaker 210 to output sounds based on the relative position between the mobile device 104 and the vehicle 108. Accordingly, the driver 106 may listen to the sounds emitted by the speaker 210 to navigate back to the vehicle 108. This process may continue until the driver 106 arrives at the vehicle 108 (e.g., the relative position determination module 218 determines that the distance between the mobile device 104 and the vehicle 108 is less than a threshold distance) or the driver 106 turns off the mobile device 104 (e.g., by pressing a button on the mobile device 104).

Figure 6:
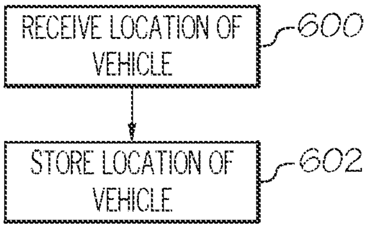
FIG. 6 depicts a flowchart of a method for operating the server of FIG. 2, according to one or more embodiments shown and described herein.

FIG. 6 depicts a flowchart for performing parking location navigation that may be performed by the server 102. Specifically, FIG. 6 depicts a flowchart of a method that the server 102 may perform to determine the location of vehicle 108 after it is parked. The flowchart is described herein with reference to FIGS. 1-2.

At step 600, the data reception module 312 may receive the position of the parked vehicle 108 as determined by the mobile device 104. Then, at step 602, the location of the parked vehicle 108 may be stored in the database 310.

Figure 7:
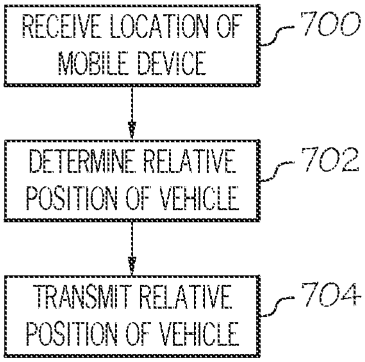
FIG. 7 depicts a flowchart of another method for operating the server of FIG. 2, according to one or more embodiments shown and described herein.

FIG. 7 depicts a flowchart for performing parking location navigation that may be performed by the server 102. Specifically, FIG. 7 depicts a flowchart of a method that the server 102 may perform to provide the relative position between the mobile device 104 and the parked vehicle 108. The flowchart is described herein with reference to FIGS. 1-2.

At step 700, the data reception module 312 may receive a current location of the mobile device 104 along with a request for parking location navigation. At step 702, the relative position determination module 314 may determine the relative position between the mobile device 104 and the parked vehicle 108. Specifically, the relative position determination module 314 may access the database 310 to determine the previously stored location of the parked vehicle 108. The relative position determination module 314 may then determine the relative position between the known location of the parked vehicle 108 and the received location of the mobile device 104 (e.g., using navigation software). Then, at step 704, the data transmission module 316 may transmit the determined relative position between the mobile device 104 and the parked vehicle 108 to the mobile device 104.

It should now be understood that embodiments described herein are directed to methods and systems for parking location navigation. When a driver parks a vehicle, a mobile device carried by the driver may determine whether a GPS signal is available. If a GPS signal is available, the mobile device may determine the location of the mobile device (e.g., using a GPS receiver). Because this is done when the vehicle is parked, the location of the mobile device will be the same as the location of the vehicle. The mobile device may then store the determined location of the vehicle and/or transmit the location of the vehicle to a server.

If a GPS signal is not available when the vehicle is parked, the mobile device may monitor the relative position between the mobile device and the parked vehicle as the driver walks away from the vehicle carrying the mobile device. When a GPS signal becomes available, the mobile device may determine its position based on a received GPS signal. The mobile device may then determine the location of the vehicle based on the current location of the mobile device and the determined relative position between the mobile device and the server. The mobile device may then store the determined location of the vehicle and/or transmit the location of the vehicle to a server.

When the driver wishes to return to the vehicle, the mobile device may determine its current location (e.g., based on a received GPS signal) and may transmit its determined location to the server with a request for parking location navigation. The server may receive the current location of the mobile device and may determine a relative position (e.g., the distance and direction) between the mobile device and the parked vehicle based on the received current location of the mobile device and the previously stored location of the parked vehicle. The server may then transmit the relative position between the mobile device and the parked vehicle to the mobile device.

After the mobile device receives the relative position between the mobile device and the parked vehicle, the mobile device may emit one or more sounds based on the relative position between the mobile device and the parked vehicle. As the driver moves while carrying the mobile device, the mobile device may continue to monitor the relative position between the mobile device and the parked vehicle. As such, the mobile device may continue to emit sounds based on the relative position between the mobile device and the parked vehicle. Accordingly, the driver may navigate to the parked vehicle using the sounds emitted by the mobile device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

determining whether a mobile device carried by a user of a parked vehicle departs from the parked vehicle;

in response to determining that the mobile device departs from the vehicle, storing a position of the vehicle at a server or the mobile device, and monitoring, using a motion sensor of the mobile device, a movement of the mobile device;

receiving a request for parking location navigation;

determining a relative position between the mobile device and the parked vehicle based on the position of the vehicle and the movement of the mobile device, wherein the relative position comprises a distance and a direction between the mobile device and the parked vehicle;

emitting, using the mobile device, one or more sounds having a volume and a pattern to be emitted;

determining whether the distance between the mobile device and the parked vehicle changes;

in response to determining that the distance changes, increasing the volume of the one or more sounds when the distance between the mobile and the parked vehicle decreases, and decreasing the volume when the distance between the mobile and the parked vehicle increases;

determining whether the direction between the mobile device and the parked vehicle changes;

in response to determining that the direction changes, changing the pattern of the one or more sounds to a high pitch for the vehicle in front of the mobile device, a low pitch for the vehicle behind the mobile device, and between the high pitch and the low pitch for the vehicle to the right or to the left of the mobile device, wherein the high pitch has a higher pitch than the low pitch; wherein a frequency at which the one or more sounds are emitted by the mobile device is based on the relative position between the mobile device and the parked vehicle.

2. The method of claim 1, further comprising: causing the one or more sounds to be emitted from the parked vehicle.

3. The method of claim 1, further comprising: transmitting a location of the mobile device to a remote computing device; and receiving the relative position between the mobile device and the parked vehicle from the remote computing device.

4. A mobile device comprising a controller configured to: determine whether a mobile device carried by a user of a parked vehicle departs from the parked vehicle; in response to determining that the mobile device departs from the vehicle, store a position of the vehicle at a server or the mobile device, and monitoring, using a motion sensor of the mobile device, a movement of the mobile device; receive a request for parking location navigation; determine a relative position between the mobile device and the parked vehicle based on the position of the vehicle and the movement of the mobile device, wherein the relative position comprises a distance and a direction between the mobile device and the parked vehicle; causing emit, using the mobile device, one or more sounds having a volume and a pattern to be emitted; determine whether the distance between the mobile device and the parked vehicle changes; in response to determining that the distance changes, increase the volume of the one or more sounds when the distance between the mobile and the parked vehicle decreases, and decreasing the volume when the distance between the mobile and the parked vehicle increases; determine whether the direction between the mobile device and the parked vehicle changes; in response to determining that the direction changes, wherein the volume changes in accordance with a change of the distance between the mobile device and the pattern changes in accordance with a change of the direction between the mobile device and the parked vehicle, and change the pattern of the one or more sounds to the pattern of the sounds is a high pitch for the vehicle in front of the mobile device, a low pitch for the vehicle behind the mobile device, and between the high pitch and the low pitch for the vehicle to the right or to the left of the mobile device, wherein the high pitch has a higher pitch than the low pitch, wherein a frequency at which the one or more sounds are emitted by the mobile device is based on the relative position between the mobile device and the parked vehicle.

5. The mobile device of claim 4, wherein the mobile device is a smart phone.

6. The mobile device of claim 4, wherein the mobile device is a key fob.

7. The mobile device of claim 4, wherein the pattern at which the one or more sounds are emitted by the mobile device is based on the relative position between the mobile device and the parked vehicle.

8. The mobile device of claim 4, wherein the controller is further configured to: transmit a location of the mobile device to a remote computing device; and receive the relative position between the mobile device and the parked vehicle from the remote computing device.

9. The method of claim 1, wherein in response to receiving a request for parking location navigation, causing a horn of the parking vehicle to sound periodically in segments.

10. The mobile device of claim 4, wherein in response to receiving a request for parking location navigation, the controller is configured to cause a horn of the parking vehicle to sound periodically in segments.

* * * * *